June 2, 1925.

C. L. CURTIS 1,540,544

TRACTION DEVICE FOR TRACTOR WHEELS

Filed Jan. 3, 1923

WITNESS
Harold L. King.

INVENTOR
C. L. Curtis
BY
Howard C. Wenden
ATTORNEY

Patented June 2, 1925.

1,540,544

UNITED STATES PATENT OFFICE.

CLAYTON L. CURTIS, OF SOUTH OTSELIC, NEW YORK, ASSIGNOR OF ONE-HALF TO SHERMAN ALTER, OF ITHACA, NEW YORK.

TRACTION DEVICE FOR TRACTOR WHEELS.

Application filed January 3, 1923. Serial No. 610,463.

*To all whom it may concern:*

Be it known that I, CLAYTON L. CURTIS, a citizen of the United States of America, of South Otselic, in the county of Chenango, in the State of New York, have invented new and useful Improvements in Traction Devices for Tractor Wheels, of which the following, taken in connection with the accompanying drawings, is a full, clear, and exact description.

This invention relates to a traction device for tractor wheels and analagous uses in which it is desired to secure a firmer support for revoluble chains or wheels travelling along and upon more or less soft ground surfaces.

The main object of my present invention is to centrally support a traction plate upon the periphery of the rim of the wheel or revoluble member in such manner that it may be free to rock longitudinally upon said rim with a greatly reduced liability of breakage or displacement.

The specific object is to support this plate by and between a pair of brackets on the rim and substantially midway between its ends so as to better resist not only the circumferential but also the diagonal and lateral thrusts incidental to the use of devices of this character and at the same time to enable the plate to contact flatwise transversely with the periphery of the wheel as different portions of the length thereof are brought into contact with the ground whereby each plate may constitute a relatively short track section to support the load as the vehicle is moved along the ground.

Another object is to provide each plate and its supporting brackets with outwardly projecting spurs or ribs for traction purposes in which the ribs of the brackets are of greater radial projection than those of the plate so as to bear the greater part of the tractional load by reason of their stronger securement to the rim of the wheel and thereby to relieve the plate from a considerable portion of the tractional load and permit it to function more particularly as a supporting medium.

Other objects and uses relating to specific parts of the device will be brought out in the following description.

Figure 1:
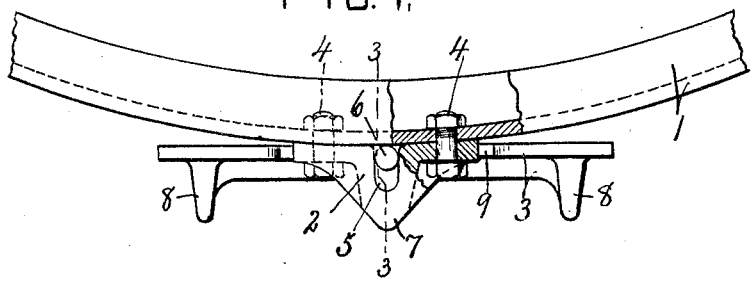
Figure 1 is a side elevation partly, in section, of a portion of a tractor wheel rim and one of my improved traction devices mounted thereon.
Figure 2:
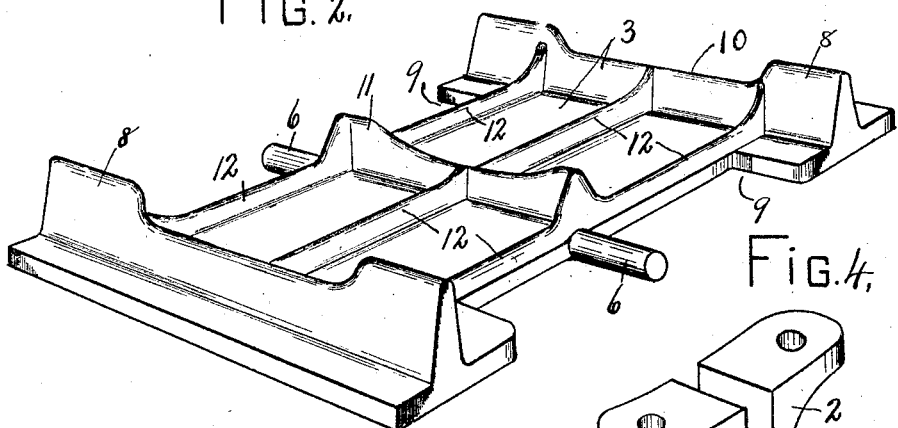
Figure 2 is an enlarged inverted perspective view of one of the detached traction plates.
Figure 4:
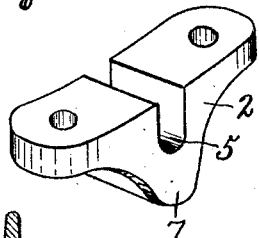
Figure 4 is a perspective view of one of the detached plate-supporting brackets.
Figure 3:
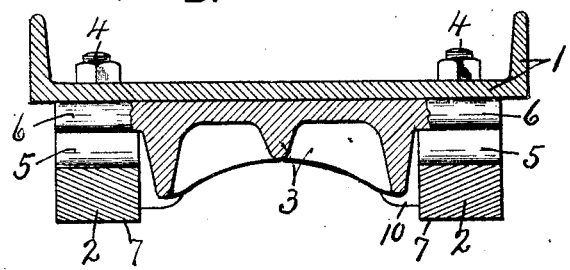
Figure 3 is an enlarged transverse sectional view taken on line 3—3, Figure 1.

In order that this invention may be clearly understood, I have shown a portion of a tractor wheel —1— and one of the traction devices applied thereto and consisting of a pair of brackets —2— and a traction plate —3—.

The brackets —2— are similar in construction and interchangeable and are secured by bolts —4— to the periphery of the rim —1— in transversely spaced relation for receiving the plate —3— between them, said brackets being provided midway between their ends with radially elongated slots —5— in transverse alinement for receiving trunnions —6— on opposite edges of the plate —3—.

The inner faces of the brackets are curved longitudinally to conform to the curvature of the periphery of the rim —1—, the bolts —4— of each bracket being disposed at opposite sides of the slot —5—.

These brackets are also provided with outwardly projecting transverse ribs —7— in radial alinement with slots —5— for tractional engagement with the surface of the ground and are preferably of greater radial depth than similar tractional ribs as —8— on the outer face of the plate —3— so as to bear the greater portion of the tractional load by reason of their firmer securement to the rim of the wheel.

The trunnions —6— are preferably formed integral with the plate —3— substantially midway between the opposite ends thereof, said plate being of considerably greater length than the brackets —2— and having the intermediate portions of its opposite longitudinal edges recessed at —9— for receiving said brackets.

The length of these recesses —9— are slightly greater than the lengths of the brackets to permit the plate to rock longitudinally without friction with said brackets but the transverse widths of the recesses are substantially equal to the width of the brackets and to the lengths of the trunnions —6— and therefore, when the brackets are assembled on the rim of the wheel and the plate —3— is assembled upon the brackets, the outer edges of the brackets will be substantially alined with the corresponding outer edges of the plate beyond the recesses.

The wider portions of the plate —3— beyond the recesses are provided with transverse tractional ribs —10— extending from edge to edge thereof, but of less radial depth than the ribs —7— on the brackets, the object of which is to bring the greater portion of the tractional load upon the stronger ribs —7— while the ribs —8— are taking part of the tractional load.

A similar transverse rib —11— is cast integral with the plate —3— midway between the ribs —10— to further assist in carrying the tractional load although of slightly less radial depth than the ribs —10— said transverse ribs being braced by a series of lengthwise ribs —12—.

The inner face of the plate —3— is substantially flat for rolling or rocking engagement with the periphery of the rim —1—, said rocking motion being permitted by the radial sliding movement of its trunnions —6— in the radially elongated slots —5— while the opposite walls of the slots serve to hold the plate against endwise displacement relatively to the brackets.

The entire traction device may be assembled on the wheel by simply supporting the trunnions in the slots of the brackets and then clamping the brackets by means of the bolts —4— to the rim of the wheel, the device being then ready for use during which the end of the plate facing the direction opposite that of the movement of the wheel will first be brought into engagement with the ground thereby forcing that end against the rim of the wheel and producing a corresponding outward movement of the trunnions —6— along the slot —5— so that as the wheel continues to move it will ride along the plate toward the opposite end thereby producing a reverse rocking movement of the plate about the axis of the trunnions —6— until said opposite end is brought into engagement with the periphery of the rim, the spurs or transverse ribs —7— and —8— serving to hold the plate against longitudinal slipping on the ground while the upper surface constitues a relatively short track along which the wheel may travel, it being understood that the major portion of the tractional load will always be borne by the ribs —7— of the brackets which are firmly secured to the rim of the wheel while the other cross ribs —8— and —11— assist materially in soft earth in holding the plate against longitudinal slipping movement and still permitting it to rock freely on the periphery of the rim to conform to the rolling motion of the wheel.

I claim:

1. A traction device for vehicle wheels comprising a traction plate having a flat inner face and the opposite edges of its central portion recessed and provided with laterally projecting trunnions midway between its ends, brackets arranged in the recesses and provided with radial slots open at their inner ends for receiving said trunnions, and means for clamping the brackets to the periphery of the wheel rim with the open ends of the slots ajacent said periphery to hold the plate in operative position.

2. A traction device for vehicle wheels comprising a traction plate having a flat inner face and the opposite edges of its central portion recessed and provided with laterally projecting trunnions midway between its ends, brackets arranged in the recesses and provided with radial slots open at their inner ends for receiving said trunnions, and means for clamping the brackets to the periphery of the wheel rim with the open ends of the slot adjacent said periphery to hold the plate in operative position, said brackets having outwardly projecting traction ribs in radial alinement with said slots and forming the outer walls thereof.

In witness whereof I have hereunto set my hand this 23rd day of December 1922.

CLAYTON L. CURTIS.

Witnesses:
 FRANK E. COX,
 HERBERT A. WEBB.